United States Patent
Mai

(10) Patent No.: US 8,740,459 B2
(45) Date of Patent: Jun. 3, 2014

(54) RELATIVE DISPLACEMENT DEVICE WITH BOTH SLIGHT PUSH FORCE AND STRONG ELASTIC PULL FORCE

(75) Inventor: Chien Cheng Mai, Taipei County (TW)

(73) Assignee: First Dome Corporation, Taipei County (TW)

( * ) Notice: Subject to any disclaimer, the term of this patent is extended or adjusted under 35 U.S.C. 154(b) by 552 days.

(21) Appl. No.: 12/966,130

(22) Filed: Dec. 13, 2010

(65) Prior Publication Data

US 2012/0093444 A1    Apr. 19, 2012

(30) Foreign Application Priority Data

Oct. 19, 2010    (TW) ................................ 99135650 A

(51) Int. Cl.
  *F16C 29/00*    (2006.01)
  *H04M 1/00*    (2006.01)
(52) U.S. Cl.
  USPC ........................................ 384/10; 455/575.4
(58) Field of Classification Search
  USPC ............ 384/7, 10, 26; 455/575.4; 379/433.12
  See application file for complete search history.

(56) References Cited

U.S. PATENT DOCUMENTS

| | | | | |
|---|---|---|---|---|
| 7,433,723 | B2 * | 10/2008 | Bae ............................. | 455/575.4 |
| 8,326,383 | B1 * | 12/2012 | Patel et al. ................. | 455/575.4 |
| 8,369,909 | B2 * | 2/2013 | Park et al. .................. | 455/575.4 |
| 2009/0298563 | A1 * | 12/2009 | Jung et al. .................. | 455/575.4 |
| 2010/0016043 | A1 * | 1/2010 | Kajita et al. .................... | 384/26 |
| 2011/0244923 | A1 * | 10/2011 | Shen .............................. | 384/26 |

* cited by examiner

*Primary Examiner* — James Pilkington
(74) *Attorney, Agent, or Firm* — Rosenberg, Klein & Lee

(57) ABSTRACT

A relative displacement device with both slight push force and strong elastic pull force includes two displacement members displaceable relative to each other. The displacement members are respectively formed with two turning displacement paths, which turn from a relative displacement direction in different directions. During displacement travel of the displacement members, the turning displacement paths intersect each other at different points as elastic pull points. Each turning displacement path has two path terminals and a turning point. The displacement reference line of the path terminals of one turning displacement path coincides with the displacement reference line of the turning point of the other turning displacement path. A first end of an elastic member is slidably pivotally positioned at the elastic pull point as an elastic pull end, while a second end of the elastic member is pivotally fixed at a fixed point of one displacement member as a fixed end.

35 Claims, 18 Drawing Sheets

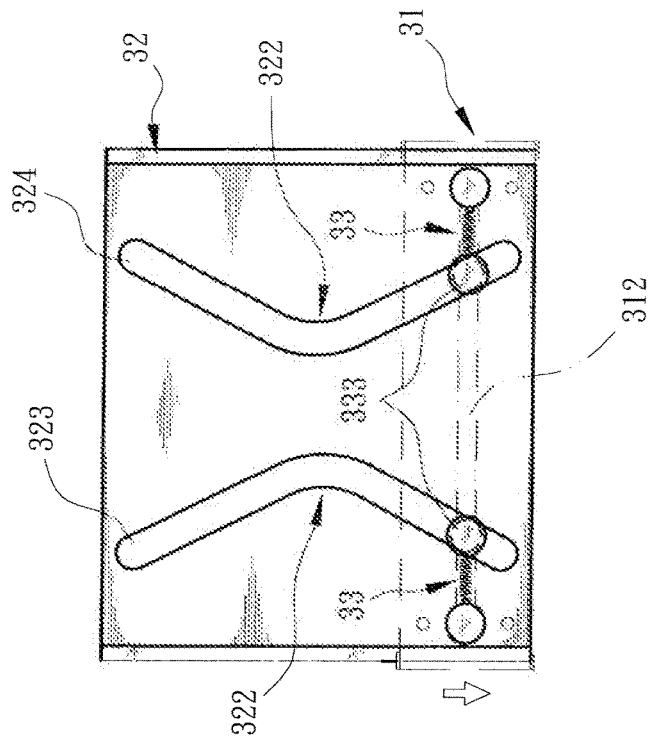
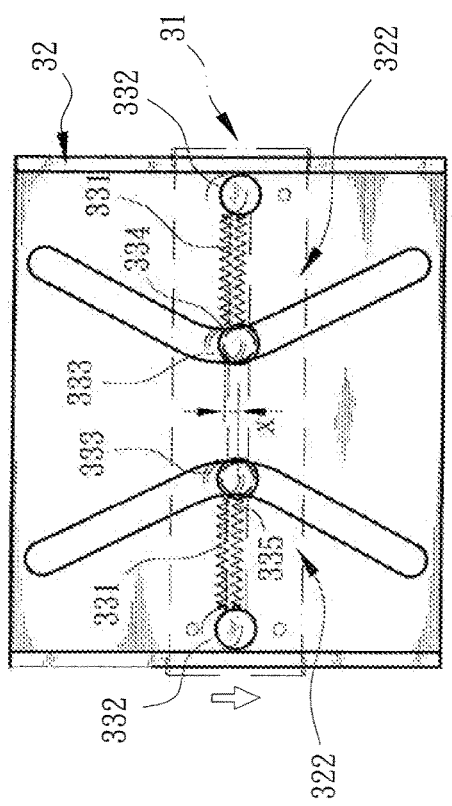
Fig. 12 PRIOR ART
Fig. 11 PRIOR ART

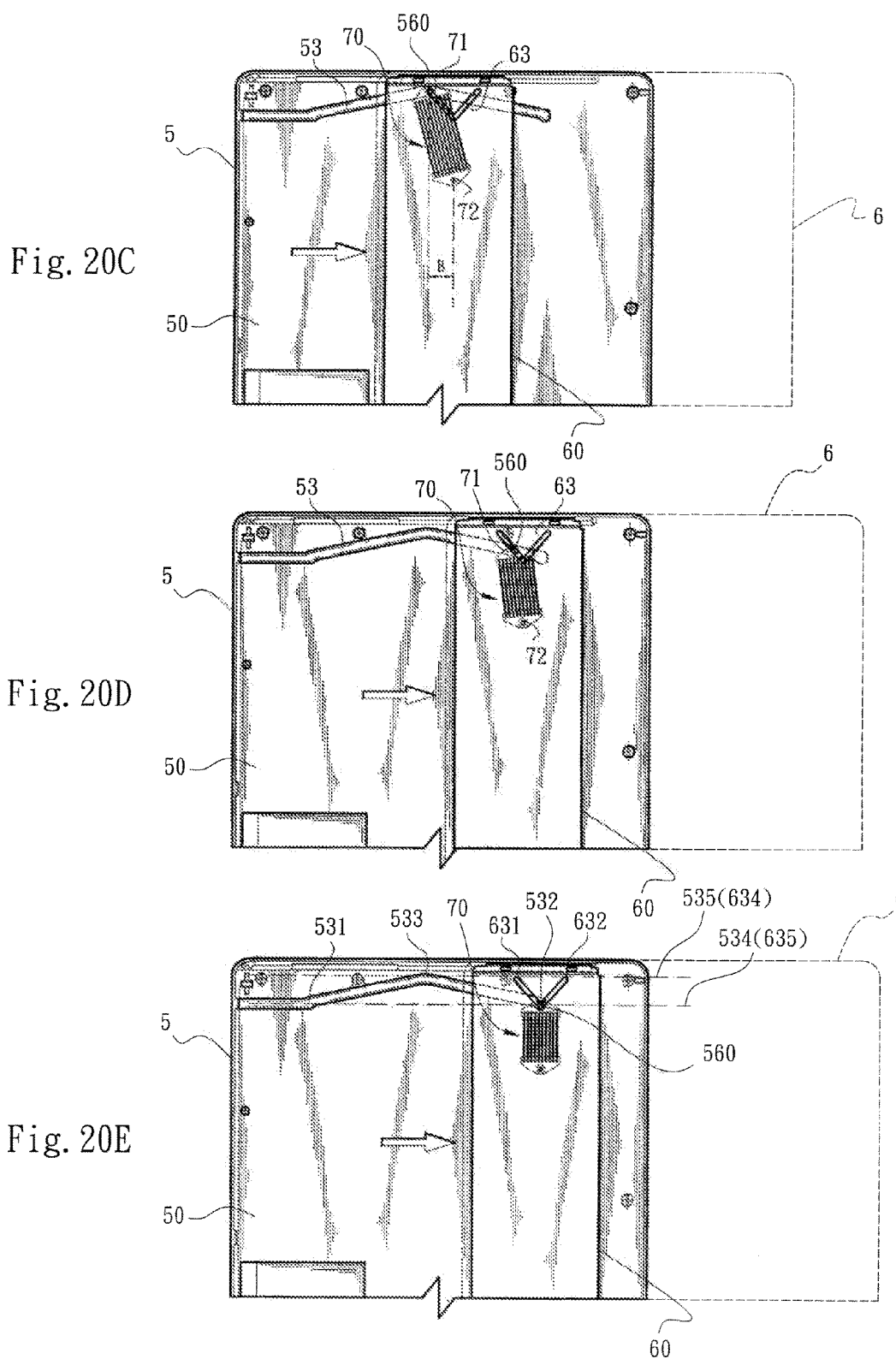

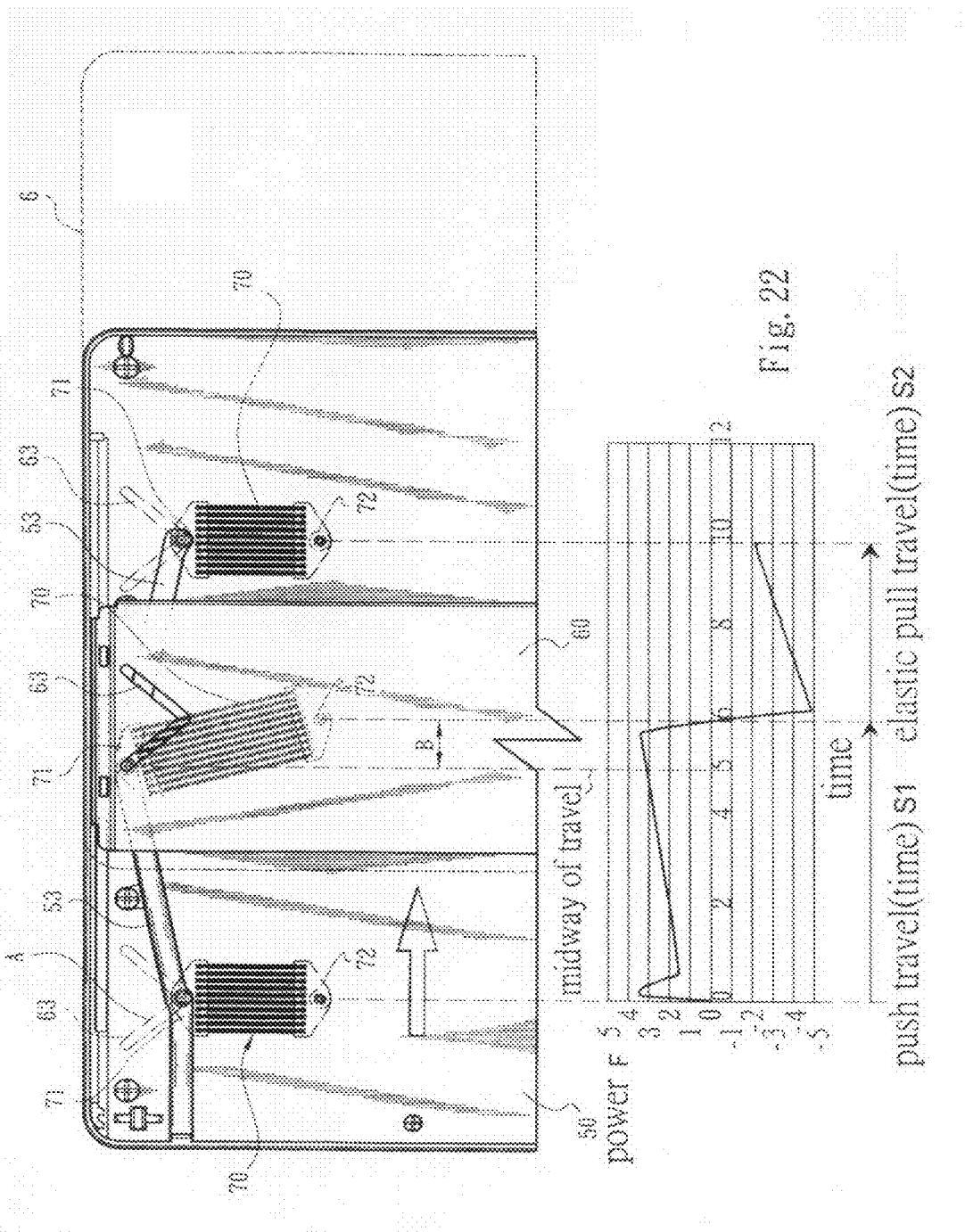

conventional device conventional device with increased elastic force

FCD slight push force and strong elastic pull force

RELATIVE DISPLACEMENT DEVICE WITH BOTH SLIGHT PUSH FORCE AND STRONG ELASTIC PULL FORCE

BACKGROUND OF THE INVENTION

1. Field of the Invention

The present invention relates generally to a relative displacement device with both slight push force and strong elastic pull force. The relative displacement device includes two displacement members, which can be displaced relative to each other. At a push stage of the displacement travel, the displacement member can be pushed with slighter push force. At an elastic pull stage of the displacement travel, the displacement member is elastically pulled by stronger elastic pull force. Accordingly, the relative displacement device of the present invention is applicable to large-size portable electronic products.

2. Description of the Related Art

Following the advanced development of electronic industries, portable electronic products make progress in pattern and function every day. Especially, for convenience in operation, the designs of human-machine interfaces of various electronic products, such as mobile communication devices (mobile phones), laptops, handheld game machines and personal digital assistants (PDA), have been more and more emphasized. In order to increase the range for the interface without enlarging the total area or volume of the product, various fold structures (snap-on covers) and slide structures (slide covers) have been developed. Although the fold products were developed earlier, the slide products are better than the fold products in appearance, function and operational convenience. As a result, the slide products have nearly totally substituted for the fold products and become most popular pattern nowadays.

At an early stage, the slide cover almost thoroughly needs to be pushed by an operator's hand and has poor hand touch feeling in operation. Therefore, the conventional slide cover needs to be improved in operational convenience. A later improved model has an end-stage automatic slide design. Accordingly, after an operator pushes the cover from a start point to a position close to an end point of the travel, the device itself will apply a resilient force to the cover for pushing the cover to the end point. This preliminarily improves the shortcoming existing in the conventional slide cover.

FIGS. 1 to 4 show a typical structure of the above slide design. The slide cover device includes an upper cover 11, a substrate 12, a torque spring 13, an arcuate restriction plate 14 and a tension spring 15. The upper cover 11 has slide rails 113 for mounting the upper cover 11 on the substrate 12. In addition, the upper cover 11 is formed with an elongated slot 111 and a stepped slot 112 in communication with the slot 111. A first end of the tension spring 15 is affixed to a head end of the slot 111, while a second end of the tension spring 15 is affixed to a slider 16 disposed in the stepped slot 112. A first end of the arcuate restriction plate 14 is connected with the slider 16. A first end of the torque spring 13 is affixed to a fixing block 17.

A fixing hole 121 is formed on a first side of the substrate 12 in which a second end of the torque spring 13 is fixed. Two slide channels 122 are formed on the first side and a second side of the substrate 12 in which the slide rails 113 are inlaid respectively. A second end of the arcuate restriction plate 14 is affixed to the second side of the substrate 12 opposite to the fixing hole 121, whereby the arcuate restriction plate 14 can swing with the sliding movement of the upper cover 11.

When the upper cover 11 is moved downward by a travel, the arcuate restriction plate 14 is swung downward (as shown by phantom line of FIG. 3) and the slider 16 is moved rightward. At this time, the tension spring 15 is extended to exert a pull force onto the slider 16. Also, the torque spring 13 is deformed into a compressed state (as shown by phantom line of FIG. 3) to store elastic energy. Under the elastic force of the torque spring 13, the upper cover 11 is kept positioned on an upper side. However, when the fixing block 17 of the upper cover 11 passes over a horizontal reference axis of the fixing hole 121, the torque spring 13 is moved downward to release the elastic energy and restore to its home state (as shown by phantom line of FIG. 4). Simultaneously, the upper cover 11 is driven to move downward and the arcuate restriction plate 14 is swung downward. At the same time, the tension spring 15 contracts to keep the upper cover 11 located at a lower end as shown in FIG. 4.

FIGS. 5 to 8 show another type of conventional slide cover structure. The slide cover structure includes a substrate 22, an upper cover 21 disposed on one face of the substrate 22, two springs 23 arranged between the upper cover 21 and the substrate 22 and two plastic washers 24 on which the springs 23 are fitted. The washers 24 serve to reduce friction between the springs 23, the upper cover 21 and the substrate 22 and avoid damage thereof. First ends of the springs 23 are rotatably disposed in two holes 221 formed on two sides of the substrate 22 respectively. Second ends of the springs 23 are rotatably fitted on two fixing blocks 17 of the upper cover 21.

When the upper cover 21 is moved downward, the left spring 23 is moved downward as shown in FIG. 7, whereby the right and left springs 23 are both deformed into a compressed state to store elastic energy. According to the positional relationship between the fixing blocks 17 and the holes 221 of the substrate 22, it is known that the upper cover 21 is still positioned in a buffering area. At this time, under the elastic force of the springs 23, the upper cover 21 is kept positioned on an upper side. However, when the fixing blocks 17 of the upper cover 21 pass over a horizontal reference axis of the fixing holes 221 (as shown in FIG. 8), the right spring 23 is driven by the upper cover 21 to move downward and release the elastic energy. At this time, the right and left springs 23 both restore to their home states (as shown by phantom line of FIG. 8). Under such circumstance, the upper cover 21 is located at a lower end.

FIGS. 9 to 12 show a locating device of a large-size slide cover for reinforcing the elastic structure thereof. The locating device includes an upper cover 31 having longitudinal slide channel rails 34 and a transverse slot 312, and two elastic members 33 each having a fixed end 332 and a free end. The fixed ends 332 of the elastic members 33 are affixed to two ends of the slot 312, while the free ends of the elastic members 33 are connected with two sliders 333. The sliders 333 are slidably inlaid in the slot 312 and directed to the middle of the slot 312. The upper cover 31 is formed with a substantially U-shaped configuration and has two folding edges 310 extending from two sides of the upper cover 31 to form two channels for mounting the slide channel rails 34 therein. Two ends of the slot 312 are formed with holes for fixedly receiving the fixed ends 332 of the elastic members 33 therein.

Two slide rails 321 are formed on two sides of the substrate 32 for slidably inserting the slide channel rails 34 therein. Each slide channel rail 34 is formed with a channel in which the slide rail 321 is inlaid. The slide channel rail 34 further has two stopper plates disposed at two ends of the slide channel rail 34 for fixing the slide channel rail 34 in the channel of the upper cover 31. Two boomerang-shaped guide slots 322 are formed on the substrate 32 opposite to each other. The sliders 333 are also slidably inlaid in the guide slots 322. The middle sections of the guide slots 322 have two pass points 334, 335 at the peaks of the guide slots 322 opposite to each other. The pass points 334, 335 define a buffering area X. After the sliders 333 move in a certain push direction to at least pass over the pass points 334, 335 of the buffering area X, the upper cover 31 will automatically continuously move in the push direction to complete the slide-out or slide-in travel.

FIGS. 13 to 16 show a large-size half-automatic slide cover structure adapted to a notebook or a laptop. The slide cover is installed on a back face of main body of the notebook and can be slid out or slid in relative to the main body.

The slide cover structure includes a fixed member 41 fixed on a back face of a first display screen. The fixed member 41 has a mount body on which at least one fixed roller unit 412 and at least one movable roller unit 414 are mounted. The movable roller unit 414 is arranged on a movable board 415 connected to an elastic member 416 for providing elastic force.

The slide cover structure further includes a slide board 42 fixed on the slide cover. The slide board 42 has at least one straight rail 421 and at least one boomerang-shaped rail 422, 423 unparallel to the straight rail 421. The fixed roller unit 412 is restrictedly movable along the straight rail 421, whereby the slide board 42 can linearly move along the straight rail 421 relative to the fixed member 41 to drive the slide cover. The movable roller unit 414 is movable along the boomerang-shaped rails 422, 423 and displaceable in a direction normal to the straight rail 421 to deform the elastic member 416. Accordingly, the elastic member 416 serves to automatically slide out or slide in the slide board 42.

It can be found from observing the above conventional relative displacement units that the elastic members are all symmetrically arranged. That is, at the anterior stage of the slide-out or slide-in travel, the elastic force gradually increases with the displacement until the displacement member reaches the middle turning point. After the displacement member passes over the middle turning point, the elastic members will release the elastic energy to half-automatically push the displacement member to the end point of the travel and locate the displacement member at the end point. Such structure fails to allow a weaker push force at the anterior stage of the travel and provides a stronger half-automatic elastic pull force at the posterior stage of the travel. In the case that the conventional structure is applied to a small-size product such as mobile phone, handheld game machine or PDA, the slide cover can be easily operated. However, in the case that such structure is applied to a large-size product such as a notebook or a more and more popular tablet PC (as shown in FIGS. 9 to 16), the relative displacement member will have heavier weight adapted to the volume of the large-size product. Under such circumstance, it is necessary to increase the automatic elastic pull force at the posterior stage of the travel for fully elastically pulling the displacement member to its true position. Accordingly, the elastic coefficient of the elastic member must be increased in adaptation to the large-size displacement member. As a result, the manufacturing cost is increased and the push force at the anterior stage of the travel is also inevitably increased. This causes heavier burden to the user in operation. Moreover, at the end of the travel, in case of excessively large elastic pull force, the product may be damaged and the lifetime of the product may be shortened.

SUMMARY OF THE INVENTION

It is therefore a primary object of the present invention to provide a relative displacement device with both slight push force and strong elastic pull force. The relative displacement device includes two displacement members displaceable relative to each other. The displacement members are respectively formed with at least two turning displacement paths, which turn from a relative displacement direction in different directions. Each turning displacement path has two path terminals and a turning point. The displacement reference line of the path terminals of one turning displacement path coincides with the displacement reference line of the turning point of the other turning displacement path. During displacement travel of the displacement members, the turning displacement paths intersect each other at different points as elastic pull points. A first end of an elastic member is slidably pivotally positioned at the elastic pull point as an elastic pull end, while a second end of the elastic member is pivotally fixed at a fixed point of one displacement member as a fixed end. At the anterior push stage of the displacement travel, the parallel displacement of the displacement member is prolonged, while at the posterior half-automatically elastic pull stage of the displacement travel, the parallel displacement of the displacement member is shortened. Therefore, the elastic resistance of the elastic member per unit push travel to be overcome is smaller to achieve a "slight push force" hand feeling. Reversely, at the elastic pull stage, the elastic force applied to the displacement member per unit travel is increased to provide stronger elastic pull force. Accordingly, the elastic member automatically pulls the displacement member to the path terminal with stronger elastic pull force. Therefore, a large-size displacement member can be more truly displaced with both "slight push force" and "strong elastic pull force" effects.

The present invention can be best understood through the following description and accompanying drawings, wherein:

BRIEF DESCRIPTION OF THE DRAWINGS

FIG. 11 is a plan view according to FIG. 10, showing that the upper cover is slid to a position near the middle turning point;

FIG. 12 is a plan view according to FIG. 10, showing that the upper cover is slid to the end of the travel;

FIG. 22 is a comparison chart showing the relationship between the travel (time) and the elastic force of the elastic member during the displacement.

DETAILED DESCRIPTION OF THE PREFERRED EMBODIMENTS

Figure 2:
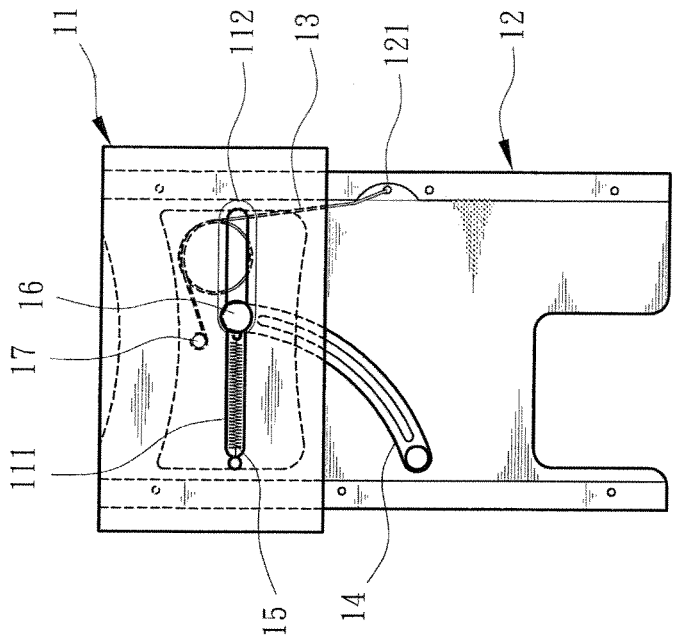
FIG. 2 is a plan view according to FIG. 1.
Figure 1:
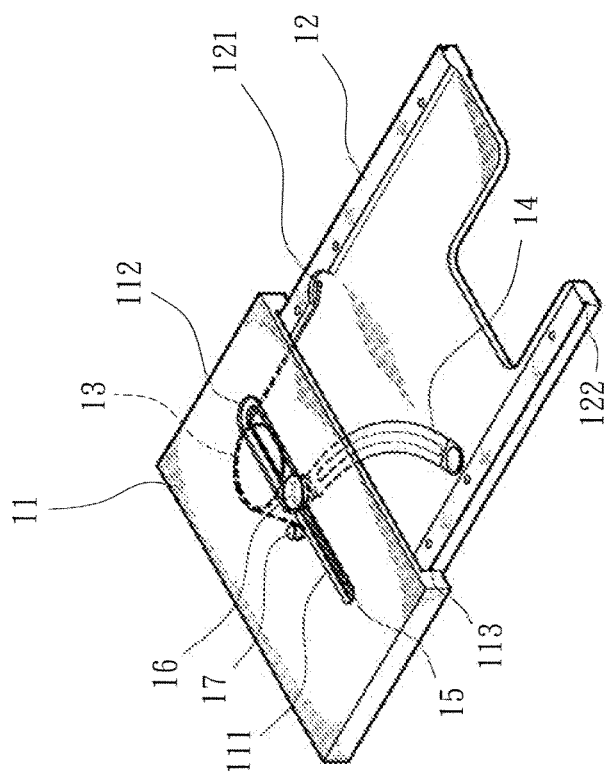
FIG. 1 is a perspective view of a first type of conventional slide cover structure.
Figure 4:
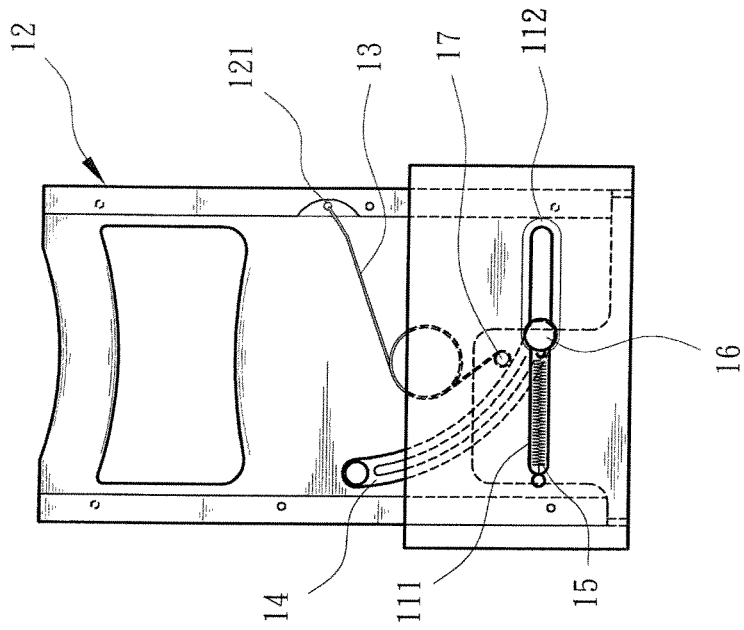
FIG. 4 is a plan view according to FIG. 2, showing that the upper cover is slid to the end of the travel.
Figure 3:
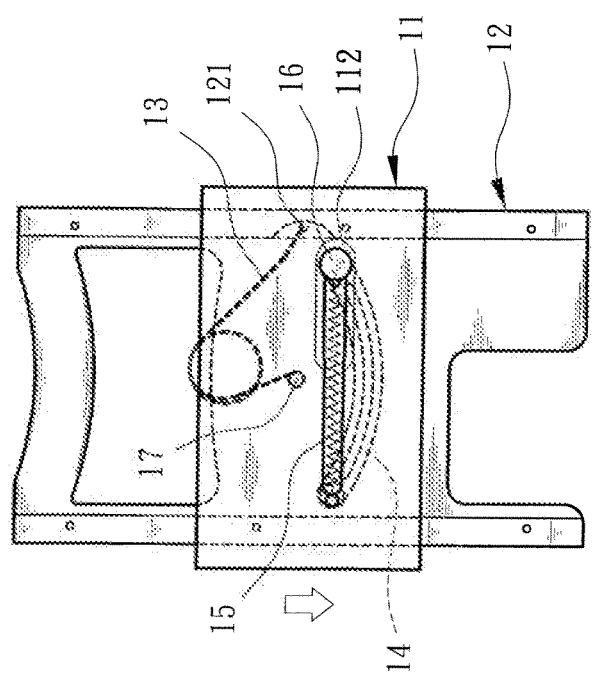
FIG. 3 is a plan view according to FIG. 2, showing that the upper cover is slid midway.
Figure 6:
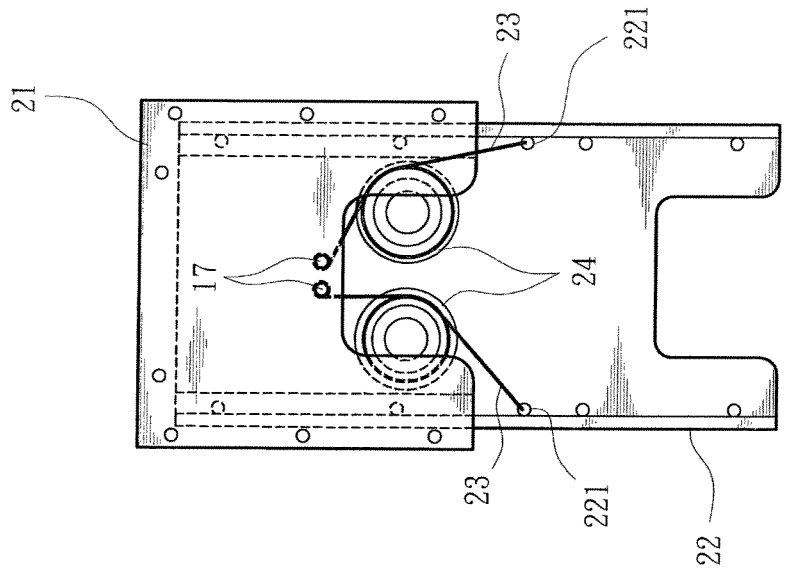
FIG. 6 is a plan view according to FIG. 5.
Figure 5:
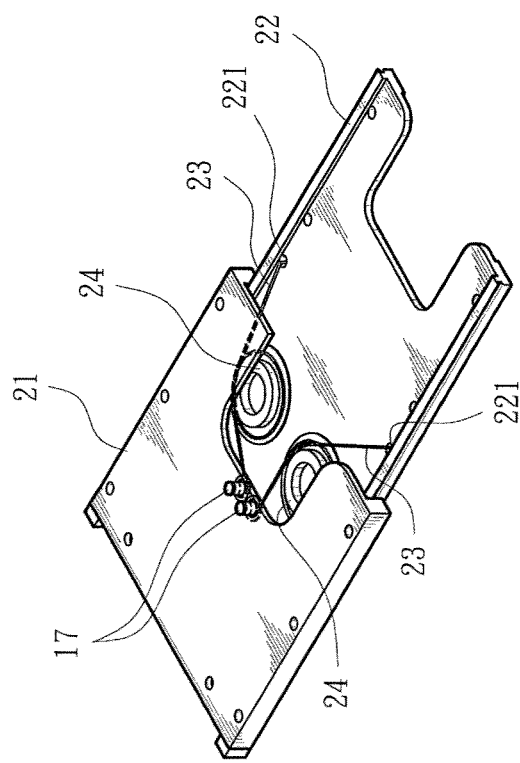
FIG. 5 is a perspective view of a second type of conventional slide cover structure.
Figure 8:
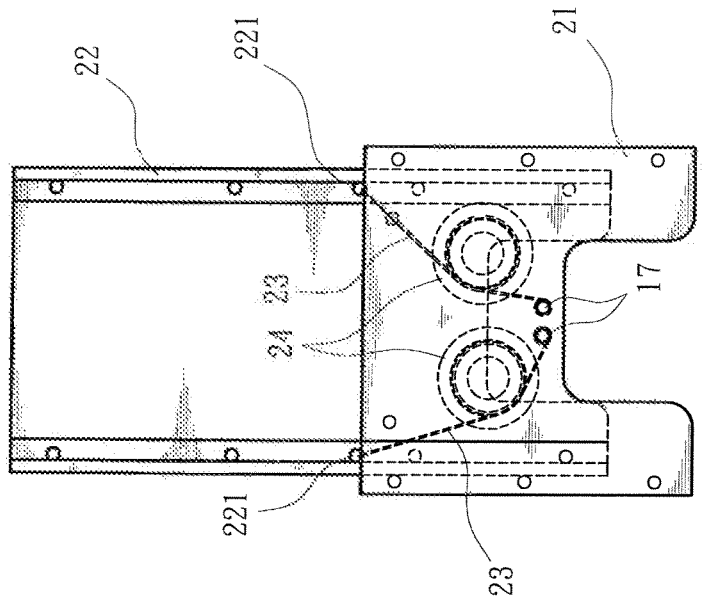
FIG. 8 is a plan view according to FIG. 6, showing that the upper cover is slid to the end of the travel.
Figure 7:
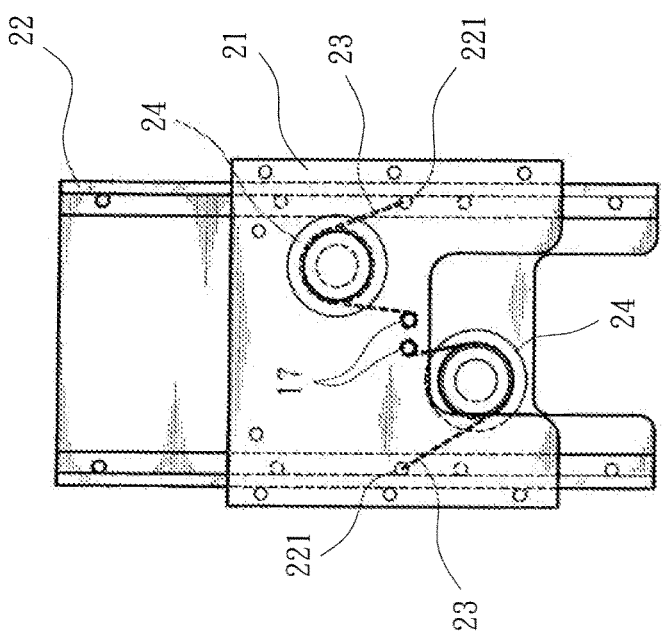
FIG. 7 is a plan view according to FIG. 6, showing that the upper cover is slid midway.
Figures 9, 10:
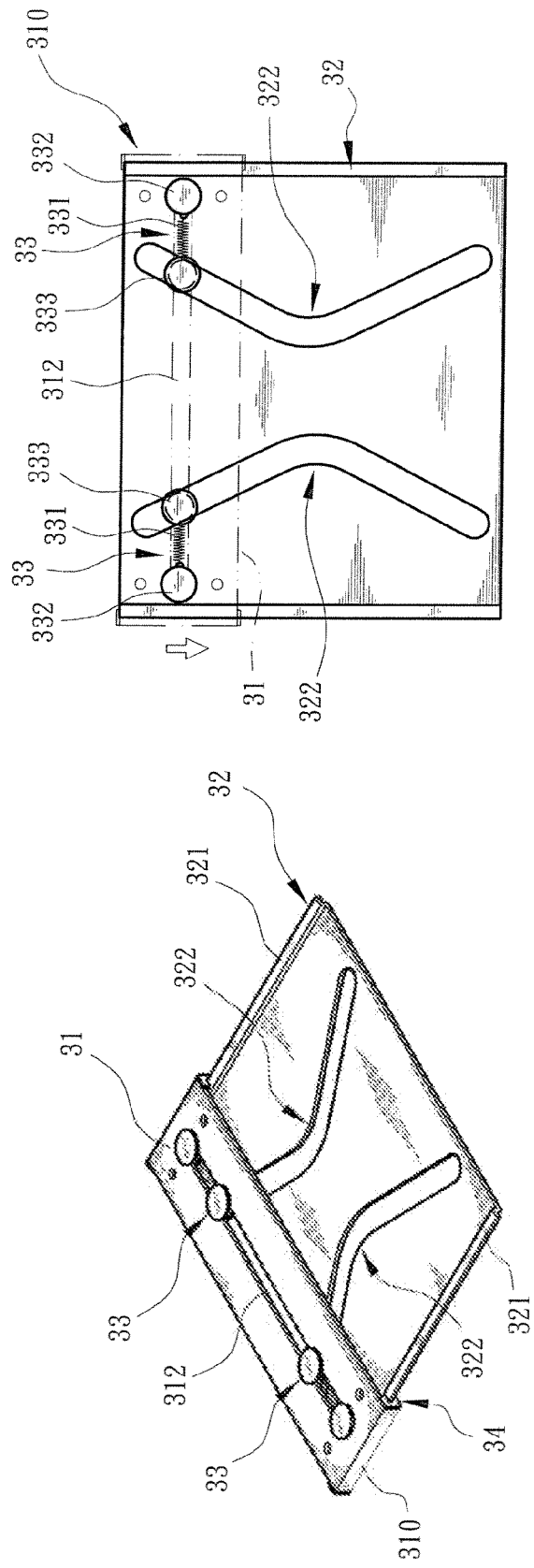
FIG. 9 is a perspective view of a third type of conventional slide cover structure.
FIG. 10 is a plan view according to FIG. 9, showing that the upper cover is slid from a start point.
Figure 13:
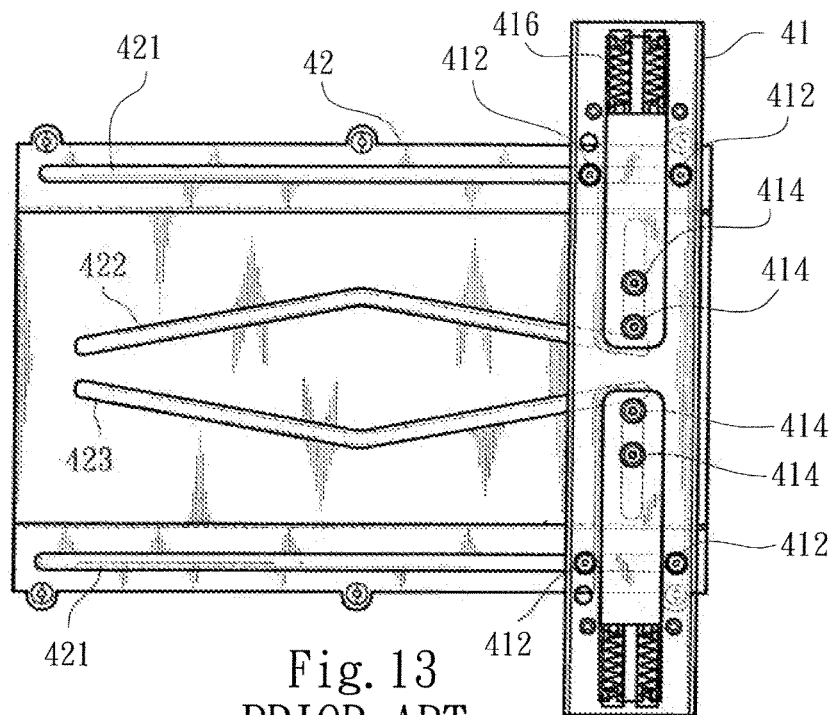
FIG. 13 is a plan view of a fourth type of conventional slide cover structure in an initial state.
Figure 14:
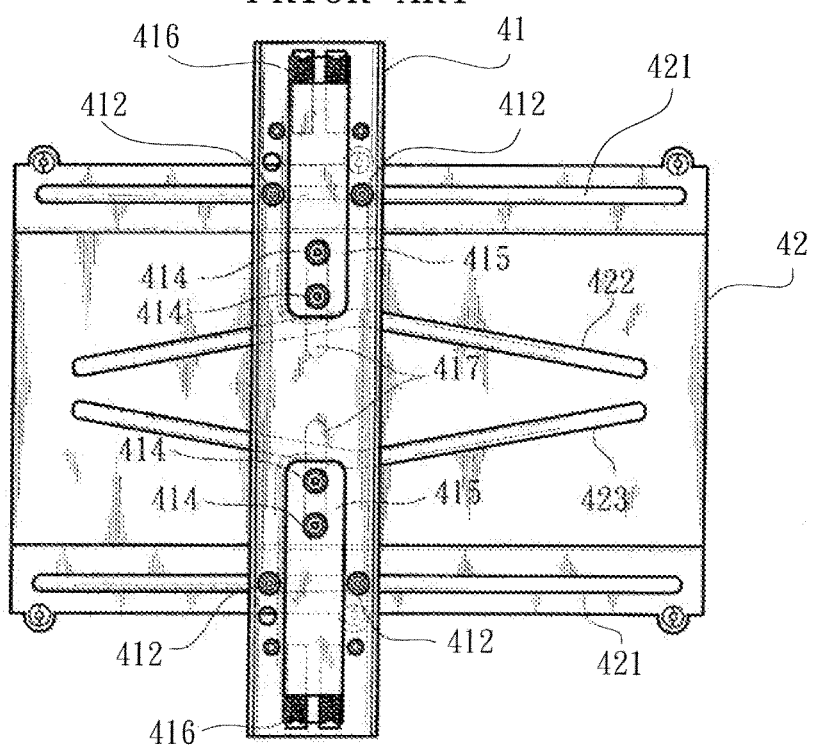
FIGS. 14 to 16 are plan views according to FIG. 13, showing the sliding movement of the upper cover.
Figure 15:
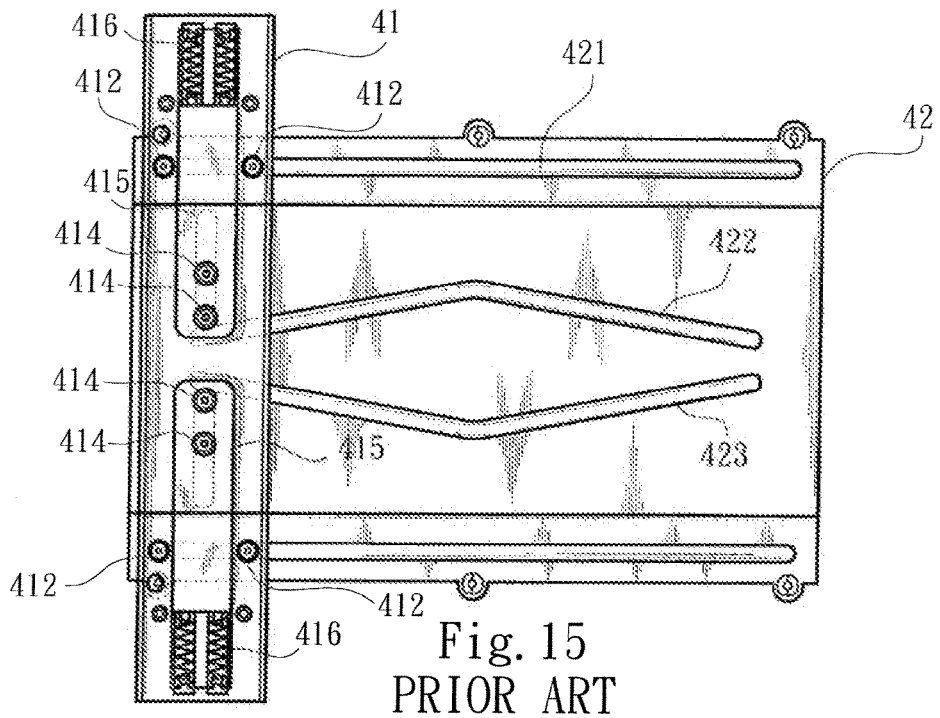
Figure 16:
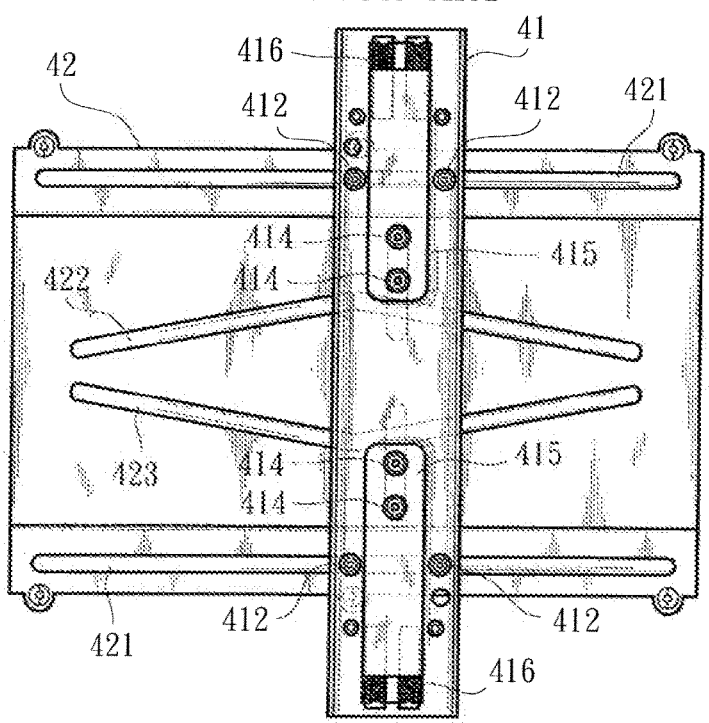
Figure 17:
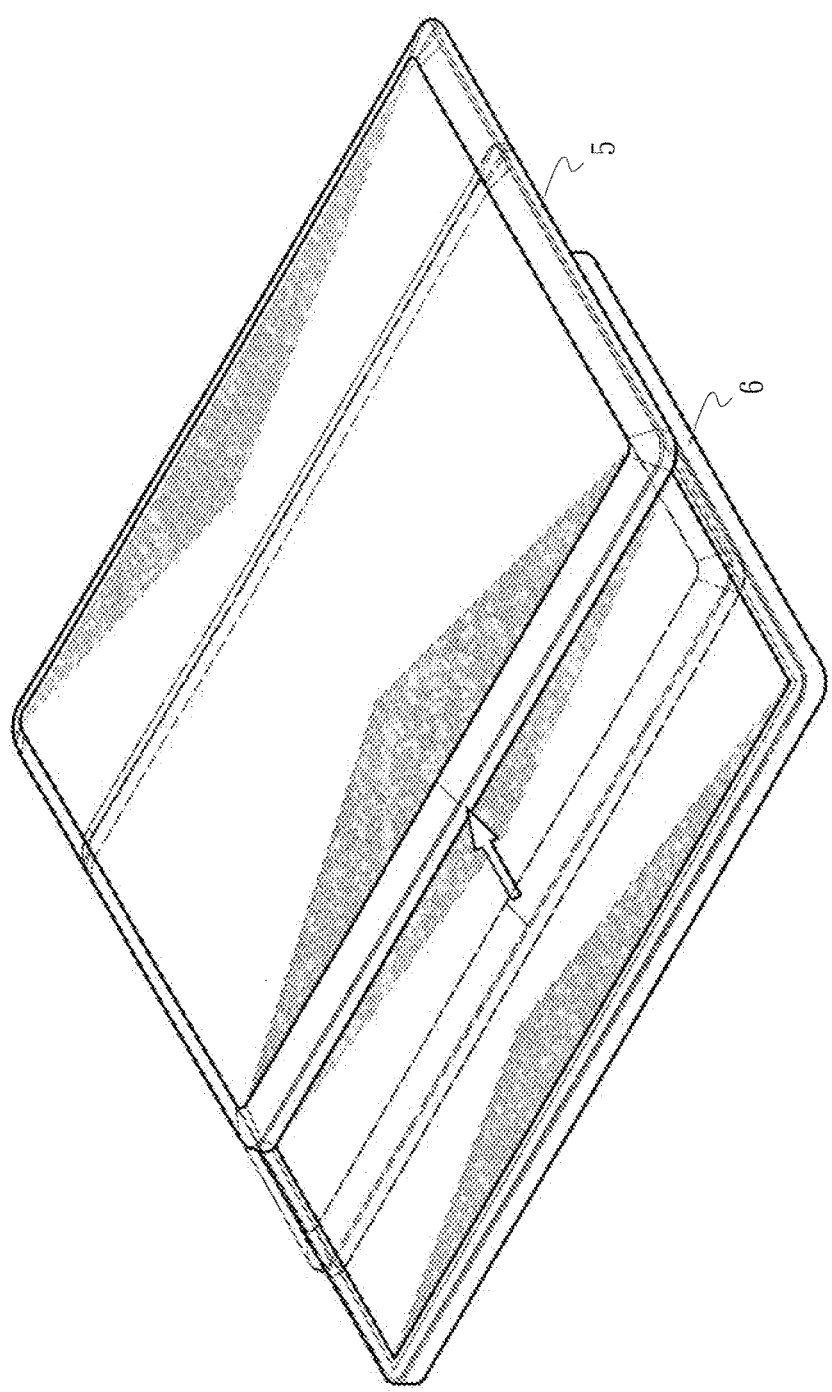
FIG. 17 is a perspective view of a slide-cover electronic device according to the present invention.
Figure 18:
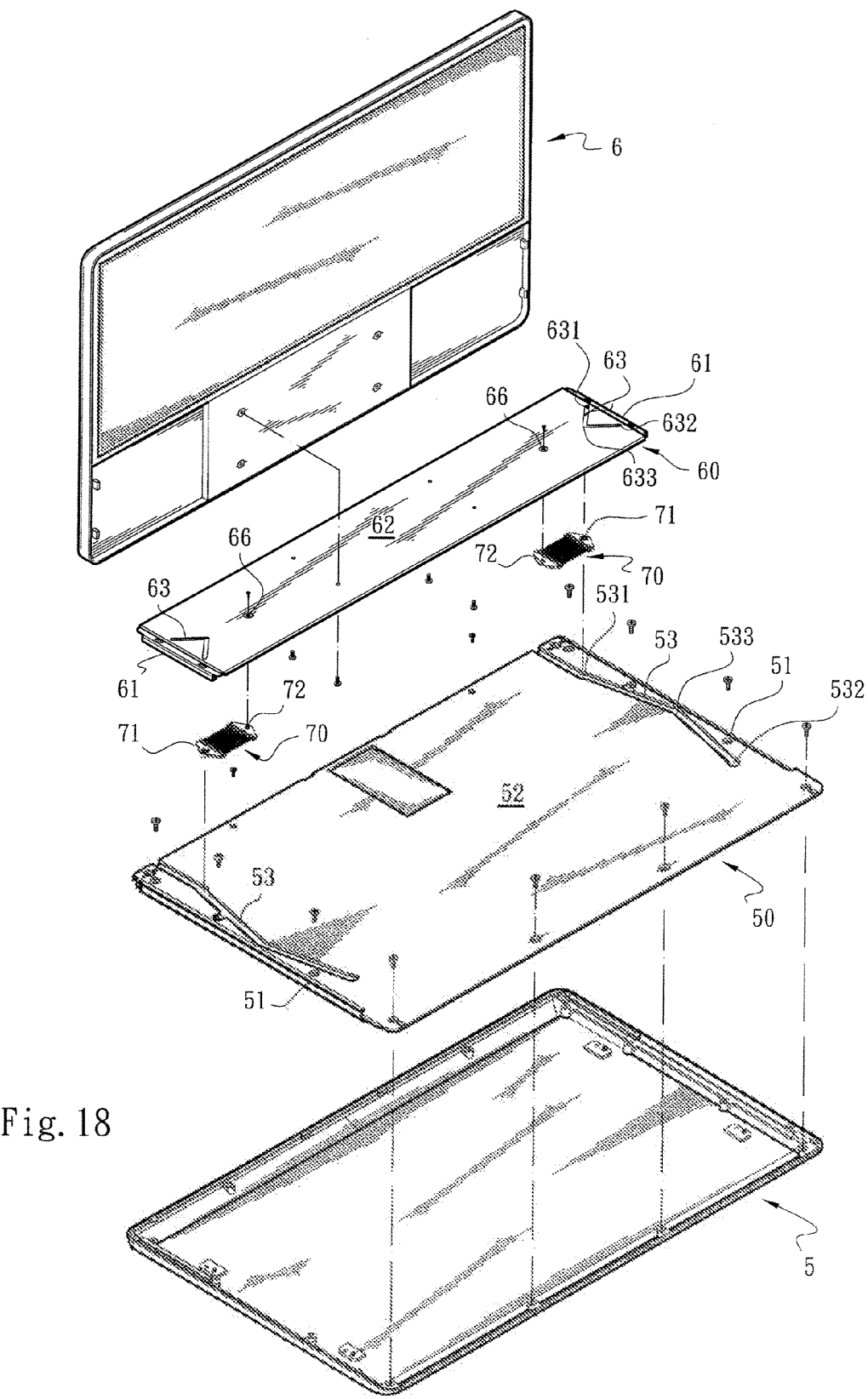
FIG. 18 is a perspective exploded view of a preferred embodiment of the present invention.
Figure 18A:
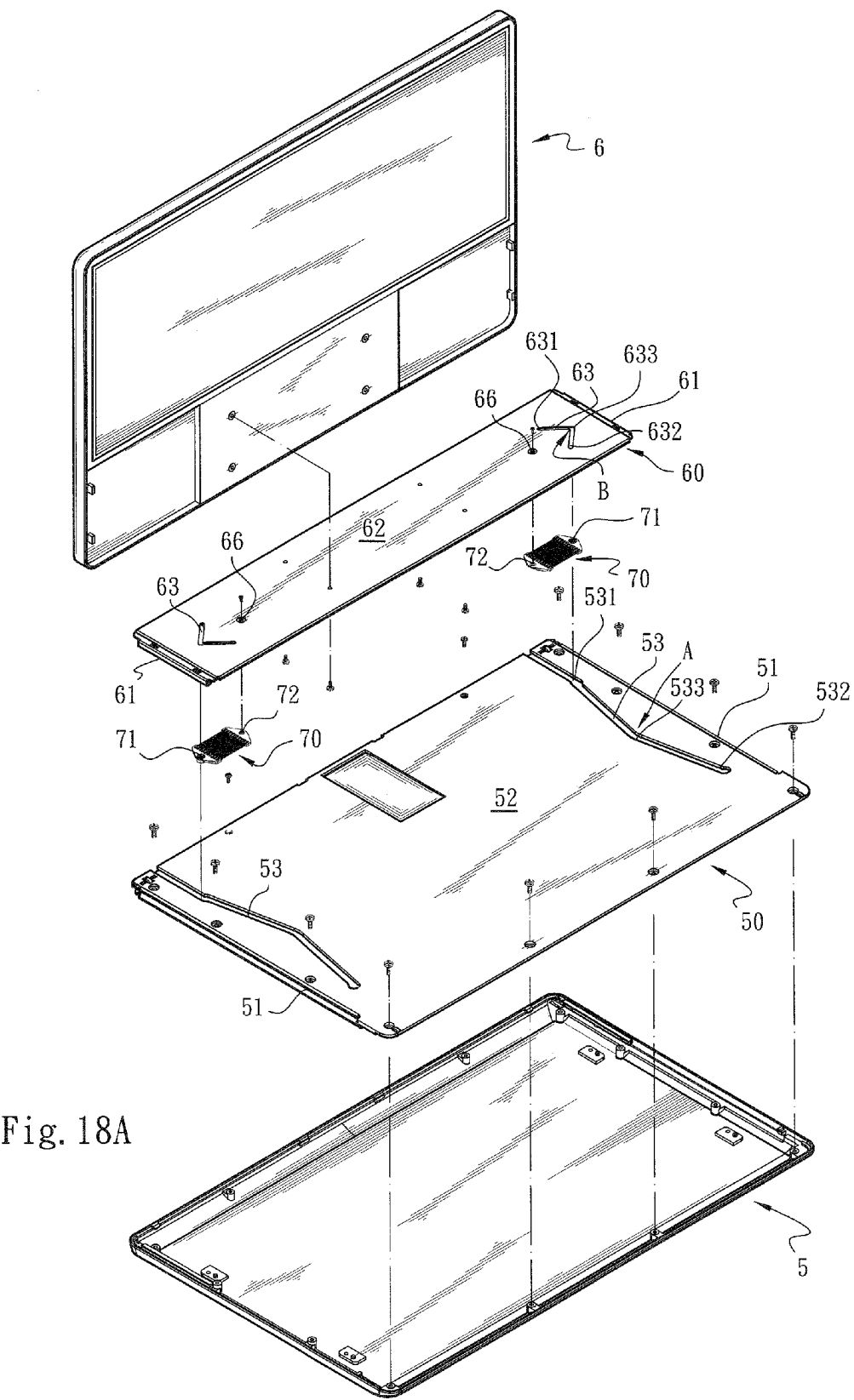
FIG. 18A is a perspective exploded view of the preferred embodiment of FIG. 18 with alternative displacement path contours.
Figure 19:
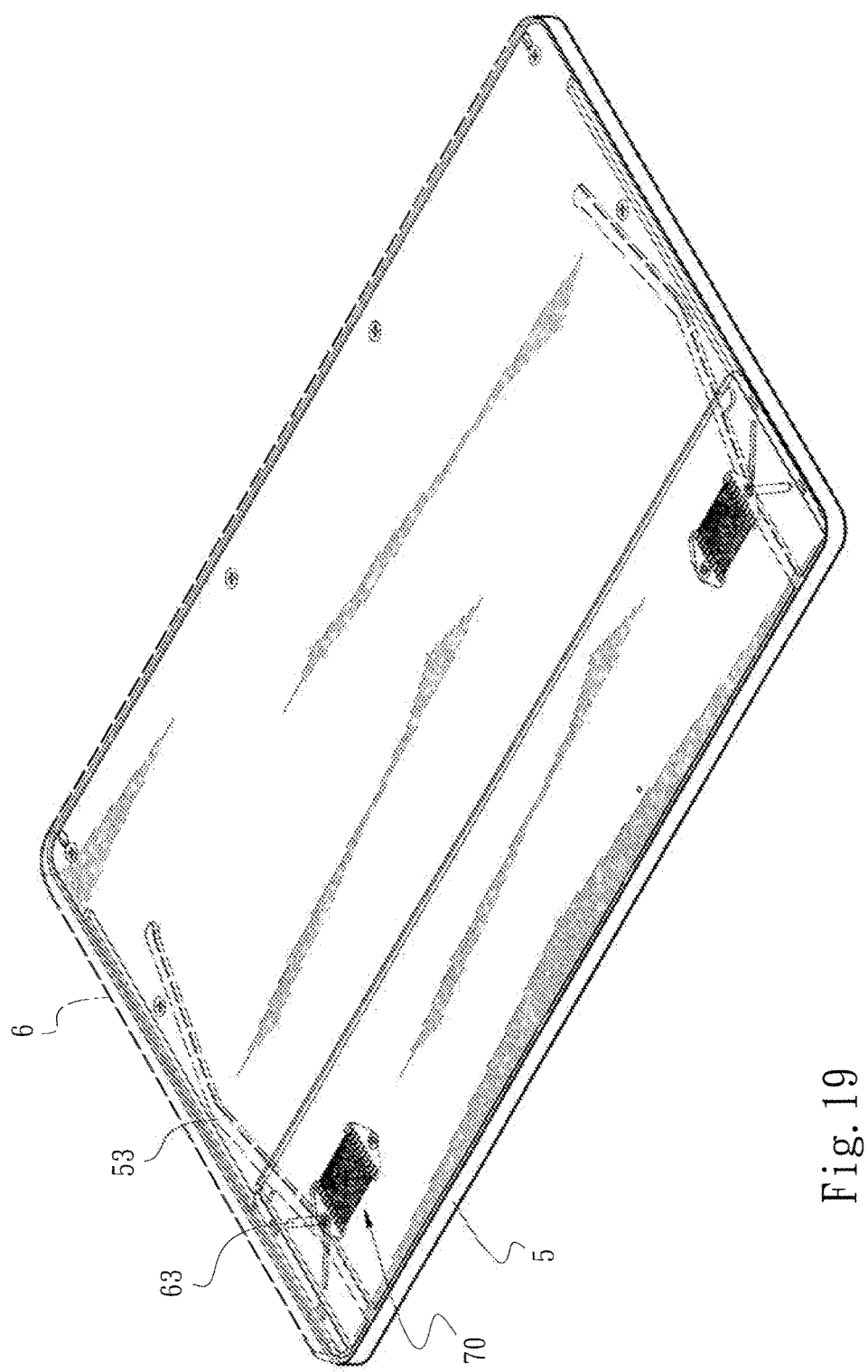
FIG. 19 is a perspective assembled view of the preferred embodiment of the present invention.

Please refer to FIGS. 17 to 19. The present invention includes at least two displacement members 50, 60, which can be displaced relative to each other. The displacement members 50, 60 can be respectively drivingly connected with a slide cover 5 and a main body 6 of an electronic product as shown in FIG. 17. The displacement members 50, 60 are formed with parallel rails 51, 61, which are slidably connected with each other. Accordingly, the displacement members 50, 60 can slide along the parallel rails 51, 61 relative to each other. That is, the displacement member 60 is relatively displaceable on a parallel displacement surface 52 of the displacement member 50 in parallel thereto (as shown in FIGS. 20A to 21E). Main turning displacement paths 53 are formed on the parallel displacement surface 52 corresponding to a parallel displacement direction. Each main turning displacement path 53 can have two path terminals 531, 532 and a turning point 533 right in the middle of the main turning displacement path 53. The main turning displacement path 53 is angularly directed and the turning point 533 has an arcuate contour. The turning point 533 has a concave side directed toward the fixed end 72 of the corresponding elastic member 70 and an oppositely directed convex side. The path terminals 531, 532 can be provided with locating sections 5311, 5321 (FIG. 20B) for locating an article moving into the path terminals 531, 532. Subsidiary turning displacement paths 63 are formed on a relative parallel displacement surface 62 of the displacement member 60 corresponding to the main turning displacement paths 53. Each subsidiary turning displacement path 63 can have two path terminals 631, 632 and a turning point 633 right in the middle of the subsidiary turning displacement path 63. The subsidiary turning displacement paths 63 is angularly directed and the turning point 633 has an arcuate contour. The turning point 633 has a concave side directed away from the fixed end 72 of the corresponding elastic member 70 and an oppositely directed convex side. Alternately, the convex side of turning point 533 may be directed toward the fixed end 72 of the corresponding elastic member 70 and the turning point 633 has a concave side directed toward the fixed end 72 of the corresponding elastic member 70. The two displacement members 50, 60 are slidably connected with each other by means of the parallel rails 51, 61. The main turning displacement paths 53 and the subsidiary turning displacement paths 63 turn from the relative parallel displacement direction in different forms. For example, as shown in the drawings, the main turning displacement paths 53 are reverse V-shaped with the openings directed to fixed ends 72 of elastic members 70. The subsidiary turning displacement paths 63 are V-shaped with the openings directed away from the fixed ends 72 of the elastic members 70. Alternatively, the turning displacement paths 53, 63 can have different forms, such as the oppositely directed displacement paths shown in FIG. 18A. The parallel displacement reference line 534 or 634 of the path terminals 531 and 532 or 631 and 632 of any turning displacement path 53 or 63 coincides with the parallel displacement reference line 635 or 535 of the turning point 633 or 533 of the other turning displacement path 63 or 53. Accordingly, when the two displacement members 50, 60 are relatively displaced in parallel to each other, the turning displacement paths 53, 63 intersect each other at different points as elastic pull points 560 (as shown in FIGS. 20A to 21E). A first end of an elastic member 70 is pivotally positioned at the elastic pull point 560 as an elastic pull end 71, while a second end of the elastic member 70 is a fixed at a fixed point (66 in the drawings) of one of the displacement members (60 in the drawings) as a fixed end 72.

Figure 20A:
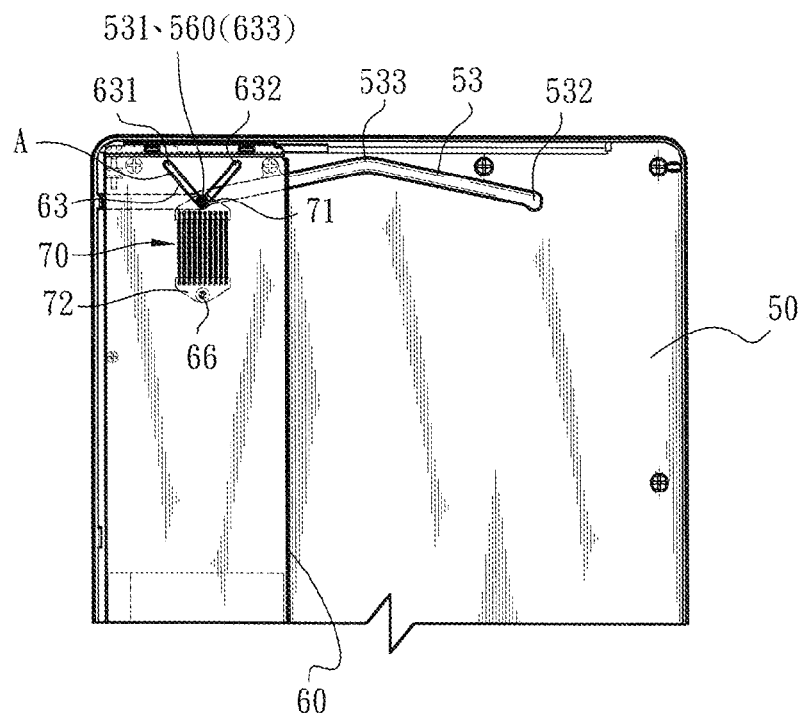
FIGS. 20A to 21E are plan views according to FIG. 19, showing the displacement member of the displacement member of the present invention.
Figure 20B:
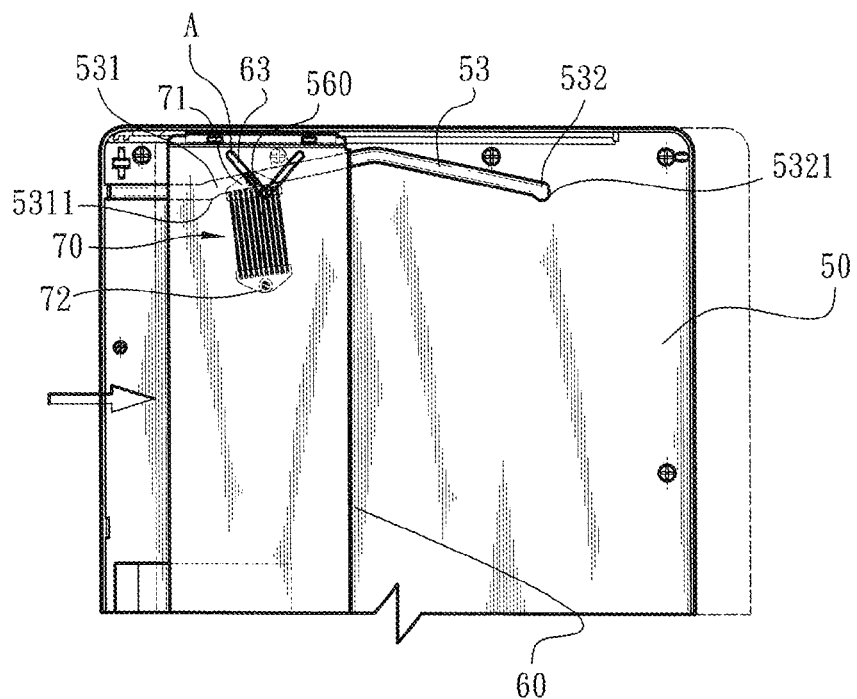

Referring to FIGS. 20A to 20E, according to the above arrangement, during the displacement, the subsidiary turning displacement path 63 will intersect the main turning displacement path 53 at different points as different elastic pull points 560. When an operator pushes the displacement member 60 with the subsidiary turning displacement path 63 from an initial position as shown in FIG. 20A to the other end of the travel relative to the other displacement member 50, the fixed end 72 of the elastic member 70 is directly displaced with the fixed point 66 in the parallel displacement direction. However, the elastic pull end 71 of the elastic member 70 at the elastic pull point 560 is forward guided to slide from the start terminal 531 of the main turning displacement path 53 to the elastic pull point 560 where the main turning displacement path 53 intersects a section A of the subsidiary turning displacement path 63 that is directed in a direction reverse to the displacement direction. In this case, the parallel displacement of the elastic pull point 560 is delayed (as shown in FIG. 20B). Therefore, when the fixed point 66, (that is, the fixed end 72 of the elastic member 70), moves to the midway of the parallel displacement corresponding to the middle turning point 533 of the main turning displacement path 53, due to the delay, the elastic pull point 560 is not yet moved to the middle turning point 533 of the main turning displacement path 53. Only after the fixed point 66 passes over the midway of the parallel displacement by a certain distance B (as shown in FIGS. 20C and 22), the elastic pull point 560 is moved to the middle turning point 533. Before this, an operator needs to push one of the displacement members (50 or 60) to overcome the elastic force of the elastic member 70 (tension of the elastic member 70 as shown in the drawings). This stage is a push stage of the travel for displacing the two displacement members relative to each other. When the elastic pull point 560 passes over the middle turning point 533 in the same direction, the elastic member 70 gradually releases the elastic energy (contraction of the elastic member 70 as shown in the drawings). This stage is a half-automatic elastic pull stage of the travel. At this stage, from the position where the fixed point 66 is spaced from the midway of the parallel displacement by the distance B, the fixed point 66 starts to elastically move to a parallel displacement position corresponding to the final displacement path terminal 532 of the main turning displacement path 53. During this period, the elastic pull end 71 of the elastic member 70 must move from the turning point 533 to the final displacement path terminal 532 at a faster speed. Therefore, it can be known from the complete displacement travel as shown in FIGS. 20A to 20E and the travel-elastic force comparison chart of FIG. 22, at the push stage of the travel, the parallel displacement of the displacement member is longer than that of the conventional device, (which is more than half of the entire travel). On the other hand, at the elastic pull stage of the travel, the parallel displacement of the displacement member is shorter than that of the conventional device. Therefore, during the entire parallel displacement, in view of the Principle of Conservation of Energy, the energy (work) stored in the tensioned elastic member 70 at the push stage is equal to the energy (work) released by the elastic member 70 at the elastic pull stage. (That is, energy (work) W=force F·distance S). Accordingly, it can be known from the above that the push distance S1 is longer than the elastic pull distance S2 so that the force F applied to the displacement member at the push stage is smaller than the elastic force at the elastic pull stage. In other words, due to the increase of the push distance, the elastic resistance of the elastic member or the resistance coming from the turning displacement paths per unit distance to be overcome is smaller than that of the conventional device (the push distance is equal to the elastic pull distance). Therefore, it is more strength-saving and easier to push the displacement member. Reversely, at the elastic pull stage, the parallel displacement of the displacement member is shorter than that of the conventional device, (which is less than half of the entire travel), for the tensioned elastic member 70 to totally release its elastic energy. Therefore, during the half-automatic elastic pull process of the displacement member, the elastic force of the elastic member applied to the displacement member per unit distance is increased to provide stronger elastic pull force for more truly driving a large-size displacement member. In this case, the problem of insufficient elastic pull force that exists in the conventional device can be solved.

Figure 21A:
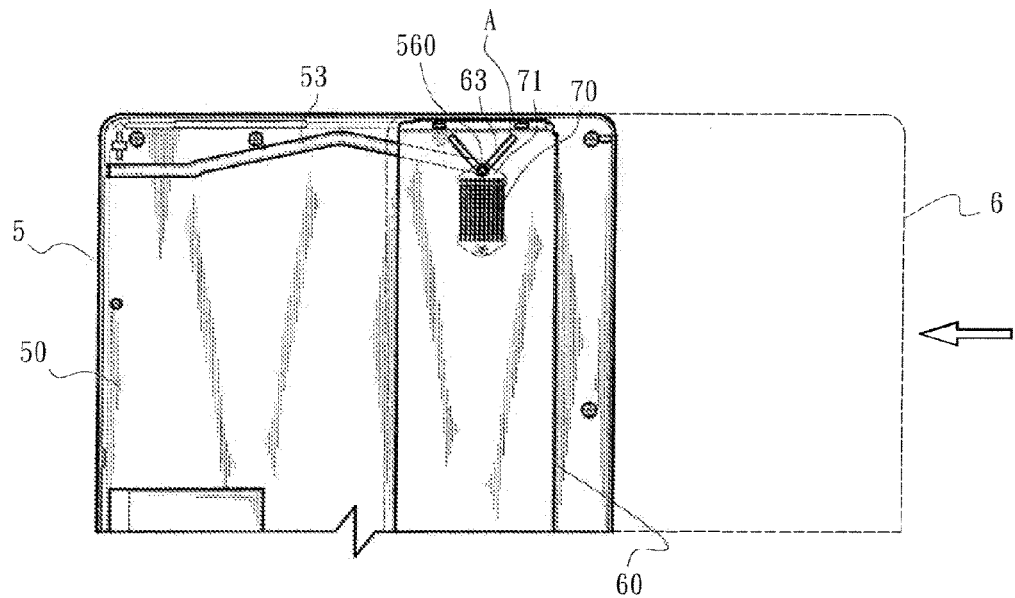
Figure 21B:
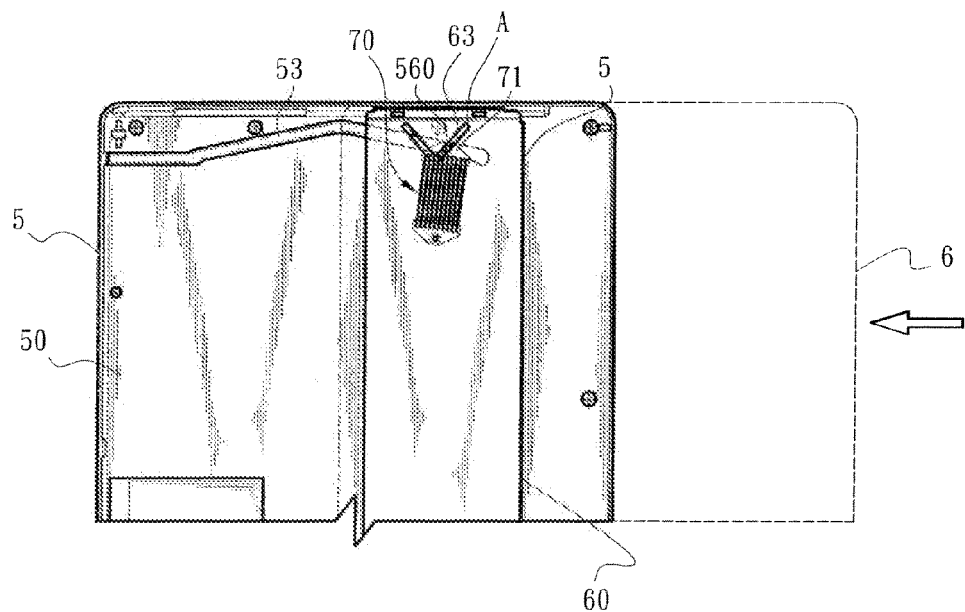
Figure 21C:
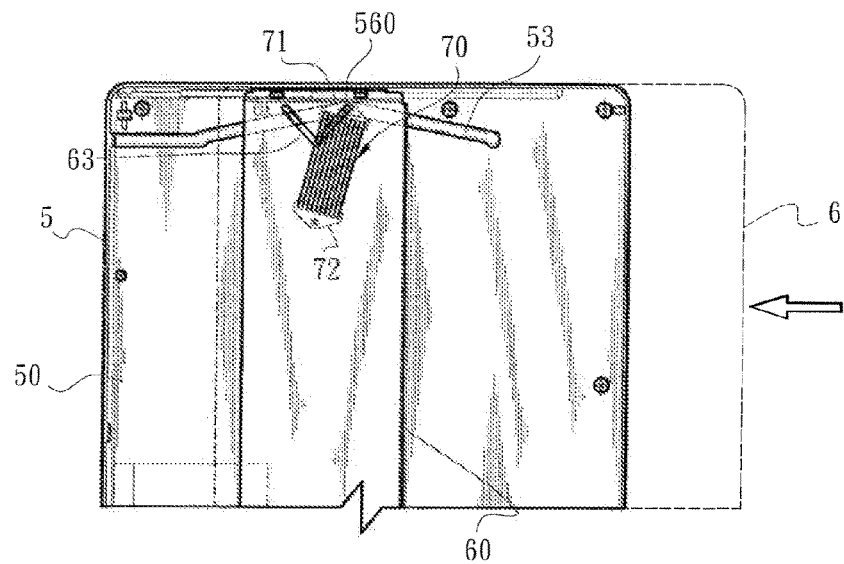
Figure 21D:
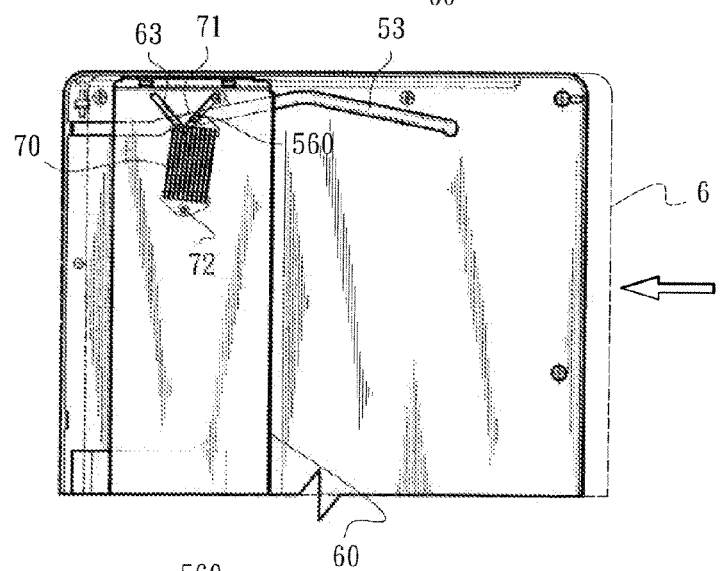
Figure 21E:
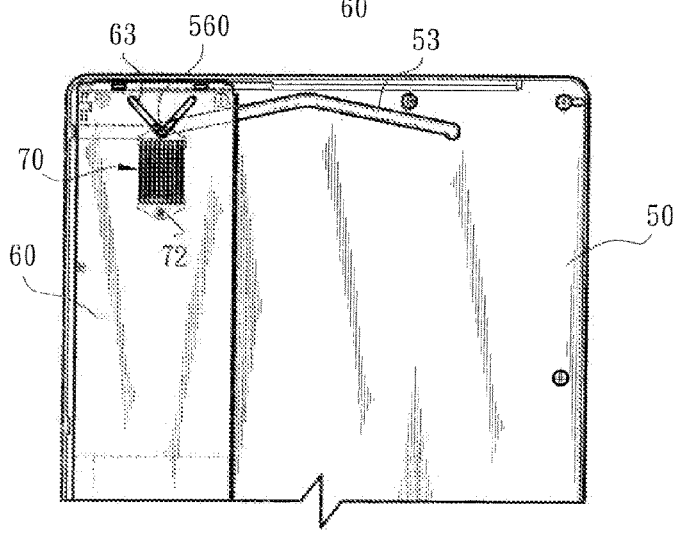

FIGS. 21A to 21E show that the displacement member 50 or 60 is pushed back to its home position in a reverse direction. As shown in FIGS. 21A to 21C, at the push stage of the travel, the parallel displacement of the displacement member is longer than that of the conventional device. In the meantime, as shown in FIGS. 21D and 21E, at the elastic pull stage, the parallel displacement of the displacement member is shorter than that of the conventional device. Accordingly, the present invention can provide a "slight push and strong elastic pull" operational hand feeling.

Please refer to FIG. 22, which is a comparison chart showing the relationship between the force applied to the displacement member 50 or 60 and the position where the displacement member 50 or 60 is positioned during one single displacement travel. It can be found from the comparison chart that in condition that the displacement member is displaced by equal unit distance per unit time, during the longer push travel (time), the force applied to the elastic member 70 increases more slowly to reach the set maximum value. On the other hand, during the shorter elastic pull travel (time), the elastic member 70 more quickly releases its elastic energy and restores to its home state, that is, the elastic force of the elastic member 70 decreases more quickly from the set maximum value to the set minimum value. In this case, the elastic resistance of the elastic member 70 per unit push travel (time) to be overcome is smaller to achieve a "slight push force" hand feeling. Reversely, at the elastic pull stage, the elastic force applied to the displacement member per unit travel (time) is increased to provide stronger elastic pull force. Accordingly, the elastic member 70 automatically pulls the displacement member to the path terminal with stronger elastic pull force. Therefore, a large-size displacement member can be more truly pulled.

In conclusion, the relative displacement device of the present invention is able to achieve the object of "slight push force" and "strong elastic pull force" to overcome the shortcoming existing in the conventional device with symmetrical structure. The relative displacement device of the present invention is idealistically applicable to the more and more popular large-size portable electronic products.

Figure 23A:
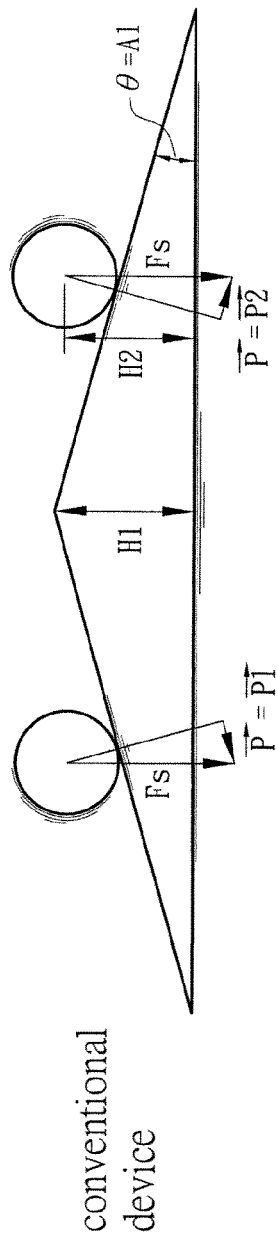
FIGS. 23A to 23C are force diagrams showing the operational force of the elastic member of a conventional device and the relative displacement device of the present invention during a complete displacement process.
Figure 23B:
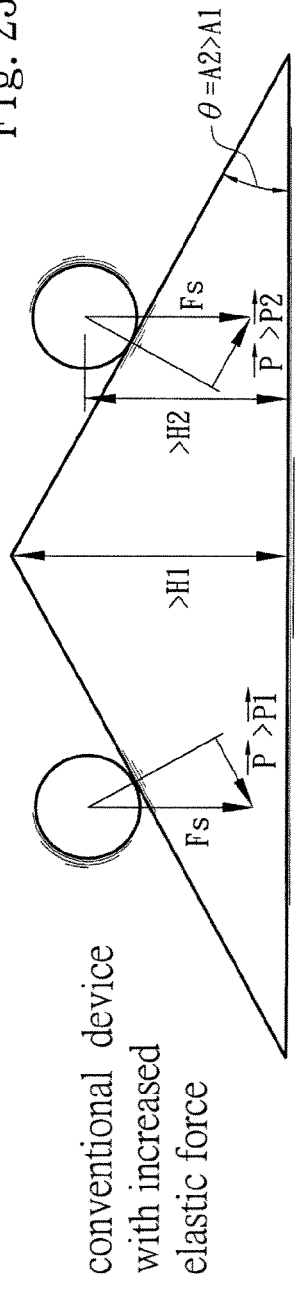
Figure 23C:
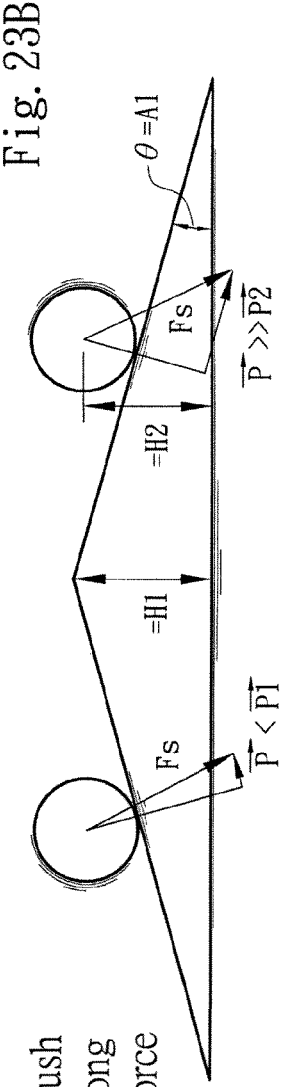

Please refer to FIGS. 23A to 23C. FIG. 23A is a force diagram showing the operational force of the elastic member in a direction normal to the pushing direction during a complete turning travel of the conventional device. FIG. 23B is a force diagram according to the conventional device, showing the operational force of the elastic member with the change rate of the turning travel increased for enhancing the elastic pull force at the elastic pull stage of the travel. FIG. 23C is a force diagram showing the operational force of the elastic member according to the present invention during the same turning travel as FIG. 23A. In all the force diagrams, the action force of the elastic member is Fs. In FIGS. 23A and 23C, the angles θ contained between the turning path and the horizontal reference line are both A1. In FIG. 23B, the angle θ contained between the turning path and the horizontal reference line is A2, which is larger than A1. It can be found from the force diagrams that according to the conventional device, at elastic pull stage of the travel, the angle θ contained between the turning path and the horizontal reference line must be increased, (that is, the slope of the turning path must be increased), to increase the elastic pull force $\vec{P_2}$. However, in this case, the push force $\vec{P_1}$ at the push stage of the travel also increases with the angle θ for overcoming the increased resistance due to steeper turning path. This can hardly achieve the object of "slight push force" and "strong elastic pull force" and is not what we expect. In contrast, as shown in FIG. 23C, the angle θ is A1 as the angle θ of FIG. 23A. However, due to the interaction between the two turning displacement paths 53, 63, during the parallel displacement, the direction of the elastic force Fs of the elastic member 70 will deflect from the horizontal reference line by an angle. Accordingly, the elastic pull force $\vec{P_2}$ will greatly increase to provide "strong elastic pull force" effect. Moreover, the angle θ is equal to A1 so that the resistance caused by the rising path is not increased. Accordingly, in combination with the deflection effect of the elastic member 70, the push force $\vec{P_1}$ is further reduced to achieve the object of "slight push force". This is obviously advantageous over the conventional device.

The above embodiments are only used to illustrate the present invention, not intended to limit the scope thereof. Many modifications of the above embodiments can be made without departing from the spirit of the present invention. For example, the bending angle, the direction and the configuration (straight line, curve or bending direction) of the turning displacement paths 53, 63 for the displacement members 50, 60 can be modified as desired. Also, the elastic member 70 can be a tension elastic member or a compression elastic member in adaptation to the turning displacement paths.

What is claimed is:
1. A relative displacement device with stronger elastic pull force than push force, comprising:
at least two displacement members, the displacement members being formed with respective rails slidably connected with each other, the displacement members being slidable along the connected rails to be linearly displaced relative to each other,
a first of the two displacement members having a main turning displacement path formed therein, the main turning displacement path being angularly directed and having at least one arcuate turning point intermediately defined therein, a second of the two displacement members having an angularly directed subsidiary turning displacement path formed therein and communicating with the main turning displacement path, the subsidiary turning displacement path being different in orientation from the main turning displacement path, the subsidiary turning displacement path having an arcuate turning point and at least one path terminal aligning with the turning point of the main turning displacement path during relative linear displacement between the first and second displacement members, an elastic member coupled to bias the relative linear displacement between said first and second displacement members, a first end of the elastic member slidably and pivotally engaging both the main turning displacement path and subsidiary turning displacement path at a point of intersection therebetween to define an elastic pull end, a second end of the elastic member being pivotally fixed to the second displacement member to define a fixed end;

wherein the elastic pull end is concurrently advanced along one of the main turning displacement path and subsidiary turning displacement path responsive to advancement along the other during relative linear displacement between the first and second displacement members, the bias of the relative linear displacement between the first and second displacement members being thereby augmented in a force range thereof;

wherein the turning point of the main turning displacement path is formed with a concave side directed toward the fixed end of elastic member and an opposing convex side, and the turning point of the subsidiary turning displacement path is formed with a concave side directed away from the fixed end of the elastic member and an opposing convex side.

2. The relative displacement device with stronger elastic pull force than push force as claimed in claim 1, wherein the main turning displacement path has a path terminal formed at one end.

3. The relative displacement device with stronger elastic pull force than push force as claimed in claim 2, wherein the turning point of the subsidiary turning displacement path is disposed in the middle of the subsidiary turning displacement path corresponding to the path terminal of the main turning displacement path in relative position.

4. The relative displacement device with stronger elastic pull force than push force as claimed in claim 3, wherein the turning point of one of the main turning point displacement path and subsidiary turning displacement path and the corresponding path terminal of the other of the main turning point displacement path and subsidiary turning displacement path are aligned when positioned in a parallel displacement reference line.

5. The relative displacement device with stronger elastic pull force than push force as claimed in claim 3, wherein the elastic member is one of a tension spring or a compression spring.

6. The relative displacement device with stronger elastic pull force than push force as claimed in claim 3, wherein the path terminal is provided with a locating section.

7. The relative displacement device with stronger elastic pull force than push force as claimed in claim 3, wherein each of the displacement members has a parallel displacement surface in the parallel displacement direction, the parallel displacement surfaces of the displacement members being relatively displaceable in parallel to each other, the main and subsidiary turning displacement paths being respectively formed on the parallel displacement surfaces of the displacement members.

8. The relative displacement device with stronger elastic pull force than push force as claimed in claim 2, wherein the elastic member is one of a tension spring or a compression spring.

9. The relative displacement device with stronger elastic pull force than push force as claimed in claim 2, wherein the path terminal is provided with a locating section.

10. The relative displacement device with stronger elastic pull force than push force as claimed in claim 2, wherein each of the displacement members has a parallel displacement surface in the parallel displacement direction, the parallel displacement surfaces of the displacement members being relatively displaceable in parallel to each other, the main and subsidiary turning displacement paths being respectively formed on the parallel displacement surfaces of the displacement members.

11. The relative displacement device with stronger elastic pull force than push force as claimed in claim 1, wherein the turning point of the main turning point displacement path and the corresponding path terminal of the subsidiary turning displacement path are aligned when positioned in a parallel displacement reference line.

12. The relative displacement device with stronger elastic pull force than push force as claimed in claim 11, wherein the elastic member is one of a tension spring or a compression spring.

13. The relative displacement device with stronger elastic pull force than push force as claimed in claim 11, wherein the path terminal is provided with a locating section.

14. The relative displacement device with stronger elastic pull force than push force as claimed in claim 11, wherein each of the displacement members has a parallel displacement surface in the parallel displacement direction, the parallel displacement surfaces of the displacement members being relatively displaceable in parallel to each other, the main and subsidiary turning displacement paths being respectively formed on the parallel displacement surfaces of the displacement members.

15. The relative displacement device with stronger elastic pull force than push force as claimed in claim 1, wherein the elastic member is one of a tension spring or a compression spring.

16. The relative displacement device with stronger elastic pull force than push force as claimed in claim 15, wherein the main turning displacement path has a path terminal formed at one end, the path terminal being provided with a locating section.

17. The relative displacement device with stronger elastic pull force than push force as claimed in claim 1, wherein each of the displacement members has a parallel displacement surface in the parallel displacement direction, the parallel displacement surfaces of the displacement members being relatively displaceable in parallel to each other, the main and subsidiary turning displacement paths being respectively formed on the parallel displacement surfaces of the displacement members.

18. The relative displacement device with stronger elastic pull force than push force, comprising:

at least two displacement members, the displacement members being formed with respective rails slidably connected with each other, the displacement members being slidable along the connected rails to be linearly displaced relative to each other, a first of the two displacement members having a main turning displacement path formed therein, the main turning displacement path being angularly directed and having at least one arcuate turning point intermediately defined therein, a second of the two displacement members having an angularly directed subsidiary turning displacement path formed therein and communicating with the main turning displacement path, the subsidiary turning displacement path being different in orientation from the main turning displacement path, the subsidiary turning displacement path having an arcuate turning point and at least one path terminal aligning with the turning point of the main turning displacement path during relative linear displacement between the first and second displacement members, an elastic member coupled to bias the relative linear displacement between said first and second displacement members, a first end of the elastic member slidably and pivotally engaging both the main turning displacement path and subsidiary turning displacement path at a point of intersection therebetween to define an elastic pull end, a second end of the elastic member being pivotally fixed to the second displacement member to define a fixed end;

wherein the elastic pull end is concurrently advanced along one of the main turning displacement path and subsidiary turning displacement path responsive to advancement along the other during relative linear displacement between the first and second displacement members, the bias of the relative linear displacement between the first and second displacement members being thereby augmented in a force range thereof;

wherein the turning point of the main turning displacement path is formed with a concave side directed away from the fixed end of elastic member and an opposing convex side, and the turning point of the subsidiary turning displacement path is formed with a concave side directed toward the fixed end of the elastic member and an opposing convex side.

19. The relative displacement device with stronger elastic pull force than push force as claimed in claim 18, wherein the main turning displacement path defines a path terminal at one end.

20. The relative displacement device with stronger elastic pull force than push force as claimed in claim 19, wherein the elastic member is one of a compression spring or a tension spring.

21. The relative displacement device with stronger elastic pull force than push force as claimed in claim 19, wherein the main turning displacement path has a path terminal formed at one end, the path terminal being provided with a locating section.

22. The relative displacement device with stronger elastic pull force than push force as claimed in claim 19, wherein each of the displacement members has a parallel displacement surface in the parallel displacement direction, the parallel displacement surfaces of the displacement members being relatively displaceable in parallel to each other, the main and subsidiary turning displacement paths being respectively formed on the parallel displacement surfaces of the displacement members.

23. The relative displacement device with stronger elastic pull force than push force as claimed in claim 18, wherein the turning point of the subsidiary turning displacement path is disposed in the middle of the subsidiary turning displacement path corresponding to a path terminal of the main turning displacement path in relative position.

24. The relative displacement device with stronger elastic pull force than push force as claimed in claim 23, wherein the elastic member is one of a compression spring or a tension spring.

25. The relative displacement device with stronger elastic pull force than push force as claimed in claim 23, wherein the main turning displacement path has a path terminal formed at one end, the path terminal being provided with a locating section.

26. The relative displacement device with stronger elastic pull force than push force as claimed in claim 23, wherein each of the displacement members has a parallel displacement surface in the parallel displacement direction, the parallel displacement surfaces of the displacement members being relatively displaceable in parallel to each other, the main and subsidiary turning displacement paths being respectively formed on the parallel displacement surfaces of the displacement members.

27. The relative displacement device with stronger elastic pull force than push force as claimed in claim 18, wherein the turning point of the main turning displacement path and the corresponding path terminal of the subsidiary turning displacement path are aligned when positioned in a parallel displacement reference line.

28. The relative displacement device with stronger elastic pull force than push force as claimed in claim 27, wherein the elastic member is one of a compression spring or a tension spring.

29. The relative displacement device with stronger elastic pull force than push force as claimed in claim 27, wherein the main turning displacement path has a path terminal formed at one end, the path terminal being provided with a locating section.

30. The relative displacement device with stronger elastic pull force than push force as claimed in claim 27, wherein each of the displacement members has a parallel displacement surface in the parallel displacement direction, the parallel displacement surfaces of the displacement members being relatively displaceable in parallel to each other, the main and subsidiary turning displacement paths being respectively formed on the parallel displacement surfaces of the displacement members.

31. The relative displacement device with stronger elastic pull force than push force as claimed in claim 18, wherein the elastic member is one of a compression spring or a tension spring.

32. The relative displacement device with stronger elastic pull force than push force as claimed in claim 31, wherein the main turning displacement path has a path terminal formed at one end, the path terminal being provided with a locating section.

33. The relative displacement device with stronger elastic pull force than push force as claimed in claim 31, wherein each of the displacement members has a parallel displacement surface in the parallel displacement direction, the parallel displacement surfaces of the displacement members being relatively displaceable in parallel to each other, the main and subsidiary turning displacement paths being respectively formed on the parallel displacement surfaces of the displacement members.

34. The relative displacement device with stronger elastic pull force than push force as claimed in claim 18, wherein the main turning displacement path has a path terminal formed at one end, the path terminal being provided with a locating section.

35. The relative displacement device with stronger elastic pull force than push force as claimed in claim 18, wherein each of the displacement members has a parallel displacement surface in the parallel displacement direction, the parallel displacement surfaces of the displacement members being relatively displaceable in parallel to each other, the main and subsidiary turning displacement paths being respectively formed on the parallel displacement surfaces of the displacement members.

* * * * *